C. C. HANSEN.
CHUCK FOR ROCK DRILLS.
APPLICATION FILED JULY 19, 1912.
1,091,510.
Patented Mar. 31, 1914.
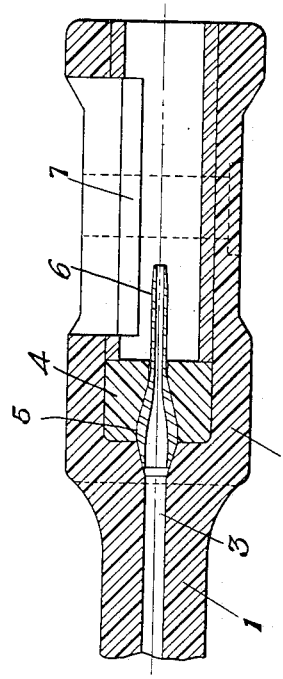
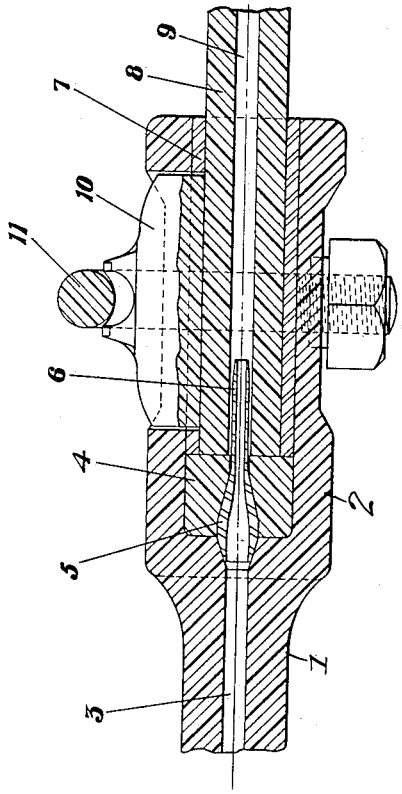
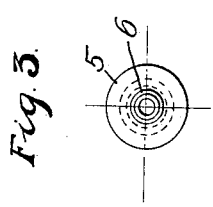
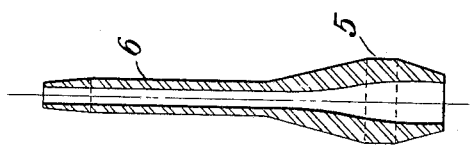
WITNESSES:
INVENTOR
Charles C Hansen
BY
ATTORNEY

UNITED STATES PATENT OFFICE.

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

CHUCK FOR ROCK-DRILLS.

1,091,510.  Specification of Letters Patent.  Patented Mar. 31, 1914.

Application filed July 19, 1912. Serial No. 710,374.

*To all whom it may concern:*

Be it known that I, CHARLES C. HANSEN, a citizen of the United States, residing in Easton, in the county of Northampton and State of Pennsylvania, have invented certain new and useful Improvements in Chucks for Rock-Drills, of which the following is a specification.

This invention relates to chucks for rock drills and more particularly to chucks for use with drills using hollow steels through which water is directed to the hole.

The object of the present invention is to provide a chuck whereby a fluid tight connection can be formed between the piston rod and the steel thus preventing water from leaking out at the joint.

With this object in view I have devised a chuck a practical embodiment of which is shown in the accompanying drawings in which—

Figure 1 shows the chuck without the drill steel and its fastening means, Fig. 2 shows the chuck with the drill steel, chuck key and the U bolt in place and Figs. 3 and 4 are details of the extension tube which carries water into the drill steel.

The drawings show the end of the piston rod 1 and the drill receiving chuck 2 which is formed integral therewith. The piston rod is formed with the central fluid carrying bore 3 the end of which where it enters the chuck, is beveled outwardly forming a circular opening which registers with an aperture in the cylindrical chuck button 4 which fits in the rear end of the drill steel receiving bore of the chuck. The aperture in the chuck button 4 is likewise beveled but in an opposite direction from the end of the bore 3. Fitting in these two beveled apertures and bridging the joint between the chuck and the chuck button is the body portion 5 of an extension tube, the front end of which is extended into a tube 6 of smaller diameter which projects for some distance forward of the chuck button into the chuck bore. The chuck bore is also provided with the usual bushing 7. When the drill steel 8 is inserted in the chuck it is forced in so that its rear end abuts against the chuck button 4, the small diameter portion 6 of the extension tube sliding into the bore 9 of the steel. The steel is secured in place by an ordinary chuck key 10 and U bolt 11.

In operation, when water is forced through the bore 3 into the drill steel it will pass into the extension tube 5, the opposite bevels of the chuck and chuck button apertures allowing a tight joint to be made between these two parts and the tube, and will be carried by means of the forward part of tube 6 for some distance into the bore of the drill steel, past the joint between the steel and the chuck button, the flow of the fluid from there on through the drill steel acting in the nature of the siphon to prevent water from returning around the outside of the tube 6 and leaking around the rear end of the drill steel. In this way a simple and efficient fluid packing can be provided without the use of rubber or other perishable packing substance.

It is to be understood that the present showing and description discloses only one specified modification of my invention and other forms and modifications are included in the spirit and scope of the invention as expressed in the claims.

What I claim is:

1. In combination, a drill piston rod, a chuck secured thereto and having a drill receiving bore, a water passage through said piston rod having a beveled opening into said chuck bore, an extension tube having a beveled portion engaging the bevel of said passage opening, said tube extending into said chuck bore, and means to secure said tube in position.

2. In combination, a drill piston rod, a chuck secured thereto having a drill steel receiving bore, a chuck button therein, an extension tube secured in said piston rod by said chuck button and bridging the joint between said chuck and said chuck button, said tube extending through and beyond said chuck button into said steel receiving bore, and being adapted to enter into the bore of a drill steel.

3. In combination, a chuck having a drill steel receiving bore having a beveled aperture in the rear wall thereof, a chuck button having an aperture therethrough provided with an opposite bevel, an extension tube having a body provided with bevels fitting said bevels of the chuck and chuck button, said body bridging the joint between said chuck and chuck button, and a tube of smaller diameter projecting from said body through and beyond said chuck button into said drill receiving bore.

CHARLES C. HANSEN.

Witnesses:
  JOHN F. MOCK,
  WM. C. MORRIS.

Copies of this patent may be obtained for five cents each, by addressing the "Commissioner of Patents, Washington, D. C."